(12) United States Patent
Sunder et al.

(10) Patent No.: US 12,222,914 B2
(45) Date of Patent: Feb. 11, 2025

(54) VERSIONED METADATA USING VIRTUAL DATABASES

(71) Applicant: Microsoft Technology Licensing, LLC, Redmond, WA (US)

(72) Inventors: Hari Krishna Sunder, Redmond, WA (US); Sandeep Lingam, Redmond, WA (US); Donald Cha, Bellevue, WA (US); Srikumar Rangarajan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 51 days.

(21) Appl. No.: 17/346,619

(22) Filed: Jun. 14, 2021

(65) Prior Publication Data

US 2022/0398232 A1    Dec. 15, 2022

(51) Int. Cl.
*G06F 16/21* (2019.01)
*G06F 16/23* (2019.01)
*G06F 16/2455* (2019.01)
*G06F 16/25* (2019.01)
*G06F 16/27* (2019.01)

(52) U.S. Cl.
CPC ........ *G06F 16/219* (2019.01); *G06F 16/2379* (2019.01); *G06F 16/2455* (2019.01); *G06F 16/256* (2019.01); *G06F 16/27* (2019.01)

(58) Field of Classification Search
CPC .... G06F 16/219; G06F 16/27; G06F 16/2379; G06F 16/2455
USPC ........................................................ 707/607
See application file for complete search history.

(56) References Cited

U.S. PATENT DOCUMENTS

| | | | | |
|---|---|---|---|---|
| 5,713,019 A | * | 1/1998 | Keaten | ..................... G06F 16/40 |
| 6,366,933 B1 | * | 4/2002 | Ball | ....................... G06F 16/957 |
| | | | | 707/E17.119 |
| 6,374,263 B1 | * | 4/2002 | Bunger | ............. G06F 16/24539 |
| | | | | 709/203 |

(Continued)

OTHER PUBLICATIONS

"International Search Report and Written Opinion issued in PCT application No. PCT/US22/028983", Mailed Date: Jan. 2, 2023, 11 Pages.

*Primary Examiner* — Sherief Badawi
*Assistant Examiner* — Jessica N Le
(74) *Attorney, Agent, or Firm* — Weaver IP L.L.C.

(57) ABSTRACT

Distributed database systems including a plurality of SQL compute nodes are described herein that enable such nodes to operate with versioned metadata despite the fact that SQL is only single-version aware. The distributed database system further includes a global logical metadata server to store and manage versions of metadata, to determine which of such versions should be visible at any given point in time, and enable creation of a virtual database that includes the proper versions of metadata. In an aspect, a central transaction manager manages global transaction identifiers and their associated start times, abort times and/or commit times that enables determination of transaction and metadata version visibility for any point in time. In an aspect, the visible metadata is included in a virtual database that logically overlays a physical database and provides the correct version of metadata in lieu of the current metadata version stored in the physical database.

20 Claims, 9 Drawing Sheets

(56) References Cited

U.S. PATENT DOCUMENTS

| | | | |
|---|---|---|---|
| 7,155,462 B1* | 12/2006 | Singh | G06F 8/65 707/999.203 |
| 7,529,778 B1* | 5/2009 | Dewey | G06F 11/1451 707/999.203 |
| 8,150,808 B2* | 4/2012 | Zha | G06F 16/256 707/661 |
| 8,364,648 B1* | 1/2013 | Sim-Tang | G06F 16/20 707/674 |
| 8,548,944 B2* | 10/2013 | Yueh | G06F 7/00 707/638 |
| 9,396,074 B2* | 7/2016 | Stewart | G06F 16/219 |
| 9,886,483 B1* | 2/2018 | Harrison | G06F 16/28 |
| 10,459,647 B1* | 10/2019 | Lazier | G06F 3/064 |
| 10,585,876 B2* | 3/2020 | Brodt | G06F 16/2365 |
| 10,802,746 B1* | 10/2020 | Lazier | G06F 3/0604 |
| 11,625,389 B2* | 4/2023 | Singh | G06F 16/27 707/703 |
| 11,880,318 B2* | 1/2024 | Ramos | G06F 13/1673 |
| 2005/0055385 A1* | 3/2005 | Sinha | G06F 16/2474 707/999.203 |
| 2006/0004755 A1* | 1/2006 | Basu | G06F 16/9574 |
| 2007/0027906 A1* | 2/2007 | Meijer | G06F 16/289 |
| 2007/0220020 A1* | 9/2007 | Goto | G06F 16/2452 |
| 2007/0260628 A1* | 11/2007 | Fuchs | G06F 16/29 |
| 2008/0228795 A1* | 9/2008 | Lomet | G06F 16/22 |
| 2008/0256138 A1* | 10/2008 | Sim-Tang | G06F 16/1873 |
| 2009/0327326 A1* | 12/2009 | Bahr | G06F 16/93 707/999.102 |
| 2011/0093435 A1* | 4/2011 | Zha | G06F 16/128 711/E12.001 |
| 2013/0212068 A1* | 8/2013 | Talius | G06F 16/128 707/E17.007 |
| 2013/0290464 A1* | 10/2013 | Barrall | G06F 15/167 709/213 |
| 2015/0019495 A1* | 1/2015 | Siden | G06F 11/1448 707/649 |
| 2016/0092526 A1* | 3/2016 | Kothari | G06F 16/27 707/602 |
| 2016/0306709 A1* | 10/2016 | Shaull | G06F 16/27 |
| 2016/0314046 A1* | 10/2016 | Kumarasamy | G06F 11/1435 |
| 2017/0075765 A1* | 3/2017 | Chen | G06F 16/2358 |
| 2017/0371895 A1* | 12/2017 | Shaw, Jr. | G06F 16/1844 |
| 2018/0060373 A1* | 3/2018 | Foebel | G06F 16/275 |
| 2018/0365104 A1* | 12/2018 | Huang | H03M 13/3761 |
| 2019/0012321 A1* | 1/2019 | Sun | G06F 16/219 |
| 2019/0243641 A1* | 8/2019 | Gass | G06F 8/427 |
| 2019/0243742 A1* | 8/2019 | Natari | G06F 11/3608 |
| 2021/0194764 A1* | 6/2021 | Badyan | G06F 9/5077 |
| 2021/0342322 A1* | 11/2021 | Rielau | G06F 16/211 |
| 2022/0091744 A1* | 3/2022 | Kutner | G06F 3/0638 |
| 2022/0197911 A1* | 6/2022 | Freedman | G06F 16/248 |
| 2022/0229835 A1* | 7/2022 | Kawabata | G06F 16/2423 |
| 2022/0276998 A1* | 9/2022 | Bian | G06F 16/219 |
| 2022/0300483 A1* | 9/2022 | Singh | G06F 16/2474 |

* cited by examiner

VERSIONED METADATA USING VIRTUAL DATABASES

BACKGROUND

Modern database workloads generated by online transaction processing and/or online analytical processing are increasingly being performed on distributed database systems that divide storage and compute workloads between a number of distributed components. Such a system may include, for example, one or more front end nodes/servers, one or more compute nodes/servers, and one or more storage nodes/servers and related storage components. Such systems divide system functions between compute and storage whereby compute nodes handle all incoming user queries and query processing activities provided by the front end/control nodes, and storage of data is handled by other components.

Such an architecture enables scaling out to petabyte sized databases, fast database restores, near-instantaneous backups, and the ability to rapidly scale both compute and storage needs up and down. The above described configuration provides flexibility, scalability and performance for online transaction processing and/or hybrid analytical processing workloads that require high transaction throughput while also enabling real-time analytics. Such systems may not, however, prove optimal for purely analytical workloads that are scan-intensive over very large data sets since all query processing is performed at compute node(s) which may necessitate moving large amounts of data from storage nodes to compute nodes for processing.

In such instances, database system performance may benefit from a columnar storage architecture whereby data is physically organized by column instead of by row. Column storage increases database read performance by reducing the amount of data that needs to be read from disk by reading only the data necessary to answer the query, and by the data compression that is enabled due to the similarity of adjacent data values within a column. Row-centric database applications (e.g., Microsoft SQL) continue to be used in these systems as control and/or compute nodes for query processing and tuple moving tasks due, in part, to their backward compatibility.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed database systems including a plurality of SQL compute nodes are described herein that enable such nodes to operate with versioned metadata despite the fact that SQL is only single-version aware. The distributed database system further includes a global logical metadata server to store and manage versions of metadata, to determine which of such versions should be visible at any given point in time, and to enable creation of a virtual database that includes the proper versions of metadata. In an aspect, a central transaction manager manages global transaction identifiers and their associated start times, abort times and/or commit times. Such data enables determination of transaction visibility, and consequently the metadata version visibility, for any point in time. In an aspect, the visible metadata is included in a virtual database that logically overlays a physical database and provides the correct version of metadata in lieu of the current metadata version stored in the physical database. In another aspect, such metadata versioning support enables snapshot isolation of metadata transactions.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
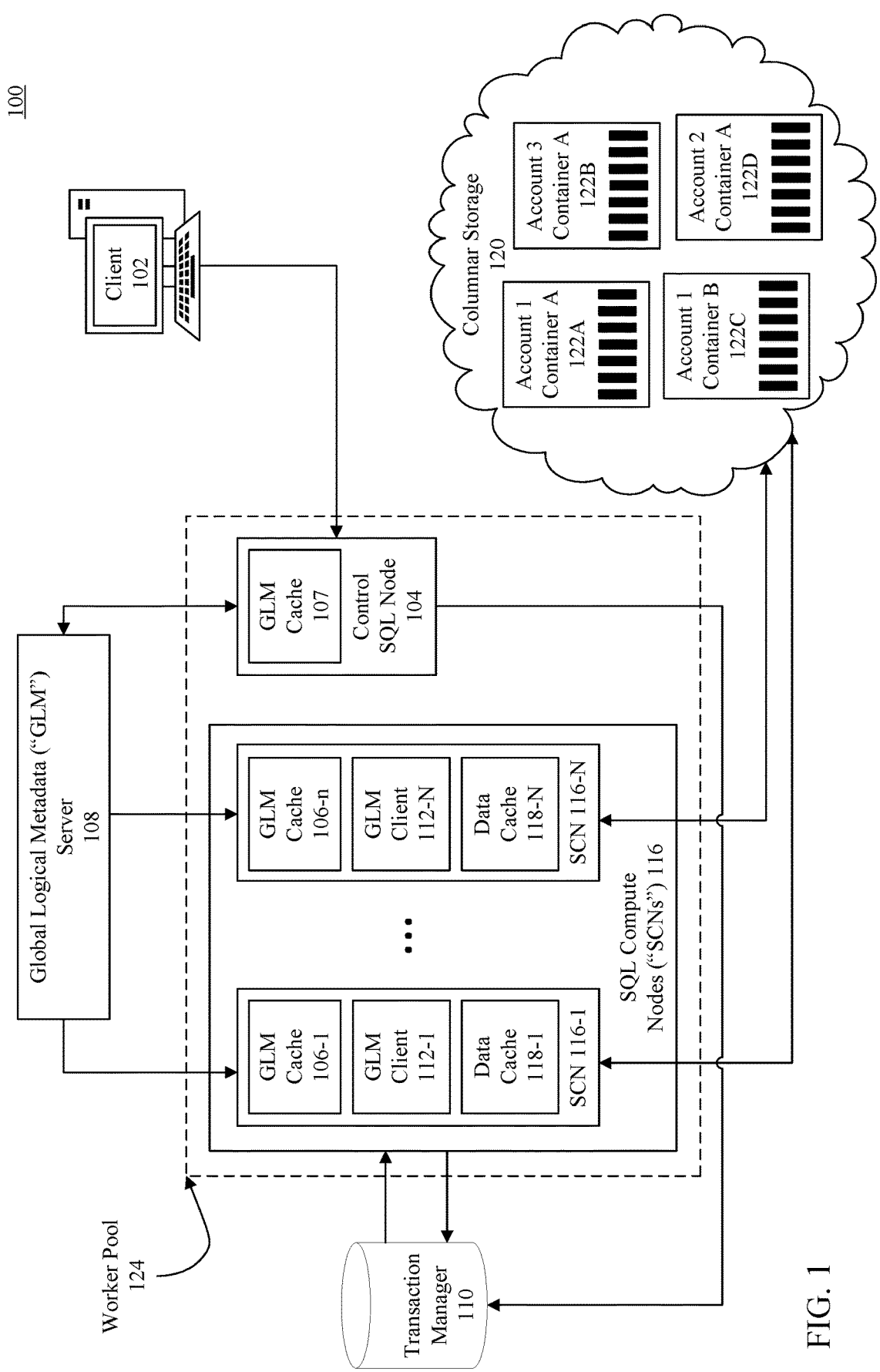
FIG. 1 depicts an example distributed database system providing versioned metadata implemented using instances of non-versioned database applications, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments of a distributed database system including versioned metadata. Section III below describes example computing device embodiments that may be used to implement features of the embodiments described herein. Section IV below describes additional examples and advantages, and Section V provides some concluding remarks.

II. Example Embodiments

Embodiments herein are described in the context of a distributed database system that provides versioned metadata, wherein control and compute nodes of the system are implemented with database applications that have non-versioned metadata as an operating assumption. For example, control and compute nodes may be implemented using instances of Microsoft® SQL that is a "single master" database application that lacks metadata versioning and requires metadata modification to be performed by a single process. These limitations result in severe scalability problems since transaction ACID compliance (i.e., transaction Atomicity, Consistency, Isolation and Durability) can only be achieved at the expense of concurrency. Embodiments disclosed herein, on the other hand, overcome the "single master" metadata issues inherent to the underlying control and compute node applications by providing such nodes with logical metadata in a virtual database that corresponds to a view of the corresponding physical database as of some point in time. As described further below, the disclosed embodiments of a distributed database system using such logical metadata provides versioned metadata that enables, among other things, snapshot isolation of data definition language ("DDL") operations that modify metadata (e.g., a database schema). A general description of the operating environment of embodiments and design motivations and descriptions follows immediately below, with a detailed description of further embodiments to follow.

These features, and others, of the disclosed embodiments are further described as follows with reference to FIG. 1. FIG. 1 depicts an example distributed database system 100 providing versioned metadata implemented using instances of non-versioned database applications, according to an example embodiment. As shown in FIG. 1, distributed database system 100 includes a client 102, a global logical metadata ("GLM") server 108, a transaction manager 110, a worker pool 124 and a columnar storage 120. Worker pool 124 includes a control SQL node 104 and SQL compute nodes 116 comprising a plurality of SQL compute nodes 116-1 to 116-$n$. Control SQL node 104 includes GLM cache 107 through which it is coupled to GLM server 108. Each of SQL compute nodes 116-1 to 116-$n$ includes a respective GLM client 112-1 to 112-$n$, GLM cache 106-1 to 106-$n$ and data cache 118-1 to 118-$n$. Each GLM client 112-1 of SQL compute nodes 116-1 to 116-$n$, respectively, is coupled to GLM server 108 through GLM caches 106-1 to 106-$n$, respectively. Columnar storage 120 is depicted as including a plurality of column store containers 122A-122D. Other structural and operational embodiments will be apparent to persons skilled in the relevant art(s) based on the following discussion regarding distributed database system 100 as depicted in FIG. 1.

The interconnections between each of client 102, control SQL node 104, GLM server 108, transaction manager 110, SQL compute nodes 116 and columnar storage 120 as depicted in FIG. 1 may represent network interconnections, in an embodiment. For example, such network connections are made via the Internet. However, portions of the depicted connections may utilize other networks such as local area networks (LANs), wide area networks (WANs), enterprise networks, and may include one or more of wired and/or wireless portions. Moreover, the depicted interconnections may represent direct connections between some or all of the various components. In other embodiments, some or all of the depicted components may be incorporated into a single system whereby the depicted interconnections are logical rather than physical. For example, transaction manager 110 and/or control SQL node 104 may together or alone be incorporated into the same component as separate logical operating units with the depicted interconnections comprising data flows between the operating units, but internal to the same physical component.

Client 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for performing operations on distributed database system 100, e.g., providing queries to a SQL compute node of SQL compute nodes 116, as well as for performing client-side functions/operations of client-server scenarios. Client 102 also includes additional components (not shown for brevity and illustrative clarity) including, but not limited to, components and subcomponents of other devices and/or systems herein, in various embodiments.

Client 102 may be a computing device associated with a domain which, as used herein, generally refers to a physical and/or logical system boundary under the control of an entity within which applications and/or services are hosted, offered, managed, and/or otherwise implemented, and also encompasses subdomains and/or the like in embodiments. Exemplary, non-limiting domains include, without limitation, web domains, tenancies of hosted cloud platforms, cloud service providers, enterprise systems, and/or any other type of network or system. A tenant is particular type of domain that is a representation of an organization in a cloud platform. The domain of the tenant in the cloud platform is its tenancy in which the tenant registers and manages applications, stores data/files, accesses services, etc.

Columnar storage 120 may be any type and/or number of data storage devices or systems, and may comprise internal and/or external storage in various embodiments. That is, columnar storage 120 may comprise a monolithic storage device/system, a cloud-based storage system, a distributed storage system, and/or the like.

Moreover, although each of client 102, control SQL node 104, GLM server 108, transaction manager 110, SQL compute nodes 116 and columnar storage 120 in FIG. 1 are depicted as monolithic components, it should be understood that such components may be embodied in any number of computing devices including servers, and may include any type and number of other resources, including resources that facilitate communications with and between computing devices connected via one of the aforementioned networks. In embodiments, servers implementing these components may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of may be co-located (e.g., housed in one or more nearby buildings with associated components such as backup power supplies, redundant data communications, environmental controls, etc.) to form a datacenter, or may be arranged in other manners. Accordingly, in an embodiment, client 102, control SQL node 104, GLM caches 106-1 to 106-n, GLM cache 107, GLM server 108, transaction manager 110, SQL compute nodes 116, data caches 118-1 to 118-n and columnar storage 120 may comprise a datacenter in a distributed collection of datacenters.

In general, embodiments comprise a set of worker pools each of which include a front-end and multiple back-end nodes. For example, distributed database system 100 of FIG. 1 includes worker pool 124 which includes control SQL node 104 (i.e., the front-end node), and SQL compute nodes 116 (i.e., multiple back-end nodes). Although distributed database system 100 of FIG. 1 is depicted as including one worker pool 124, embodiments are not so limited, and distributed database system 100 may include additional instances of worker pool 124, each including a front-end control node and multiple back-end compute nodes.

Each worker pool, and consequently each compute node of each worker pool, works off the same user database(s), performs updates thereto, and can access data and/or metadata as of a prior point in time. Moreover, and as will be described further herein below, a schema of the objects in any database may be altered or deleted by one of SQL compute nodes 116 while a concurrent query is scanning that same schema on any worker pool. Such alterations and deletions are typically performed by DDL operations being executed on one of SQL compute nodes 116. For example, and as will be described below, a user of client 102 may connect to worker pool 124 and execute a T-SQL DDL statement by sending such statement to control SQL node 104. Control SQL node 104 may perform the alteration/deletion by executing the command through one of SQL compute nodes 116 which performs the command in a transaction. As mentioned above, such transactions must be ACID compliant as will now be described in further detail.

As mentioned herein above, data and/or metadata modifications performed by distributed database system 100 are performed in the context of an ACID compliant transaction, and embodiments of distributed database system 100 are ACID compliant. As known in the art, ACID is an acronym that denotes a set of properties of database transactions that ensure that data (or metadata) persisted to the database is valid despite errors that may arise due to, for example, hardware failures or power failures. The ACID properties are Atomicity, Consistency, Isolation and Durability. Transactions performed by distributed database system 100 are ACID compliant inasmuch as the operations that logically correspond to the transaction collectively satisfy the ACID properties.

The Atomicity property of a transaction demands that the transaction either completely succeed, or completely fail. For a transaction to completely fail means that the database is left unchanged. For example, suppose a transaction comprises transferring money from account A to account B. The entire transaction comprises a number of steps as follows: funds are debited from account A, funds are transferred to wherever account B is held, and funds are credited to account B. In this situation, atomicity guarantees that no funds are debited from account A if, for whatever reason, funds are not credited to account B.

The Consistency property ensures that a transaction conform to all applicable rules governing the storage of the data such that the transaction brings the database from one valid state to another valid state.

The Isolation property ensures that different transactions that execute concurrently leave the database in the same state that would have been obtained if the transactions were executed in series. Isolation is the main goal of concurrency control, and embodiments discussed further herein below enforce such concurrency controls on metadata operations with distributed database system 100 despite such concurrency controls not being possible on any of control SQL node 104 or SQL compute nodes 116 in isolation.

Finally, the Durability property guarantees that once a transaction is committed (i.e., completed and persisted to the database in an ACID compliant manner), the transaction will remain committed and that no hardware, system or power failure can cause the transaction to be lost or for the database to enter an otherwise inconsistent state. With further reference to distributed database system 100 of FIG. 1, ACID properties of transactions performed by distributed database system 100 are ensured, in part, through the use of logging performed by control SQL node 104 as follows.

In order to maintain the ACID properties of the transaction, control SQL node 104 may be configured to generate a log record for the transaction when the transaction commits and store that record in a transaction log before any data modifications caused by the transaction are written to disk, in an embodiment. In another embodiment, logging may be handled by either control SQL node 104 or transaction manager 110, alone or in combination with one another.

A log record for a committed transaction includes all the information necessary to re-do the transaction in the event there is a problem (e.g., power failure) before the data modified by the transaction can be stored (e.g., in columnar storage 120). A log record may comprise information that includes, but is not limited to, a transaction identifier, a log sequence number, a time stamp, information indicating what data object or objects was/were modified and how, and the like. In an embodiment, the log record information is managed and/or provided by transaction manager 110 in conjunction with log manager 218.

As mentioned above, control SQL node 104 interacts with transaction manager 110 at the start of a transaction with transaction manager 110 maintaining a transaction ID and start time for the transaction. Transaction manager 110 is centralized and available to provide transaction services to all SQL compute nodes 116 on all worker pools. In embodiments, SQL compute nodes 116 are configured to acquire a list of active and aborted transactions as of any point in time from transaction manager 110, and to use such information for versioning purposes as described further herein below. SQL compute nodes 116 may also acquire locks through transaction manager 110 as needed.

Embodiments are configured to provide metadata versioning through the global logical metadata ("GLM") service. The GLM service is implemented and managed through GLM server 108, and GLM clients 112-1 to 112-n that are instantiated on each compute node of SQL compute nodes 116. The GLM service manages all aspects of database metadata including centralized storage of metadata and all versions thereof on GLM server 108, caching of all such metadata in the GLM client 112 at each of SQL compute nodes 116, and provides user queries with consistent views of the schema and other metadata dependent objects of the database while concurrent updates are in progress (i.e., enables snapshot isolation). The GLM service as implemented on GLM server 108 and GLM clients 112-1 to 112-n enables all these capabilities while allowing each of SQL compute nodes 116 to adhere to its single master design assumption without having to change the legacy SQL components and features that assume metadata within a database is not versioned. The GLM service accomplishes this by providing an abstraction layer on top of a database whereby each compute node of SQL compute nodes 116 is provided with a logical view of a given database as of a particular point in time. These operations will now be further described in the context of FIGS. 2 through 4.

Embodiments implement versioned metadata using database application instances that do not support versioned metadata and, indeed, operate with the baseline assumption that every item of metadata associated with a database is in fact unique (i.e., has only one version). Numerous SQL database components are dependent on metadata and each such component likewise does not support multiple versions of metadata. Thus, support for versioned metadata in such systems would typically require a substantial redesign and/ or re-implementation of the entire system. The embodiments disclosed herein avoid such a redesign through the use of virtual databases where each virtual database corresponds to a snapshot of the metadata at one point in time (i.e., each metadata version corresponds to one virtual database instance). Such virtual databases are then logically mapped onto and essentially overlay the relevant metadata and related components of a user database. The logical combination of the user database and virtual database thereby create a logical database as of the corresponding point in time, and reflect the version(s) of metadata that existed at that point in time. Each such virtual database comprises tables, objects and the like that are dependent on the metadata in some way. Examples of such tables and objects will be described in greater detail below with reference to FIG. 2.

It should be appreciated that the above described operation of distributed database system 100 makes versioning-based snapshot isolation possible on database systems that do not natively support metadata versioning. In particular, GLM server 108 maintains a create and drop transaction version for every metadata version. GLM server 108 and/or transaction manager 110 also maintain a transaction visibility list for each transaction that dictates which transactions, and consequently which metadata version(s), are visible to that transaction. These capabilities are enabled, in part, by the GLM server 108 which maintains a complete history of committed metadata transactions. Versioning-based snapshot isolation is thereby enabled in the following general manner.

The versioning framework of the disclosed embodiments invoke a copy-on-write mechanism when metadata is modified or deleted. This requires that while the transaction performing such modification or deletion is still running, that the old version of the metadata must be available for transactions that require an earlier transactionally consistent state. Accordingly, when a versioning-based isolation level is enabled, GLM server 108 stores a version of metadata each time that metadata is modified. Each new version of the metadata may be stored along with the transaction identifier of the transaction that committed the modification along with a commit timestamp thereby allowing embodiments to determine the point in time when a given version came into existence. Alternatively, committed transactions and associated timestamps may be maintained separately from the versions that correspond to same.

Figure 2:
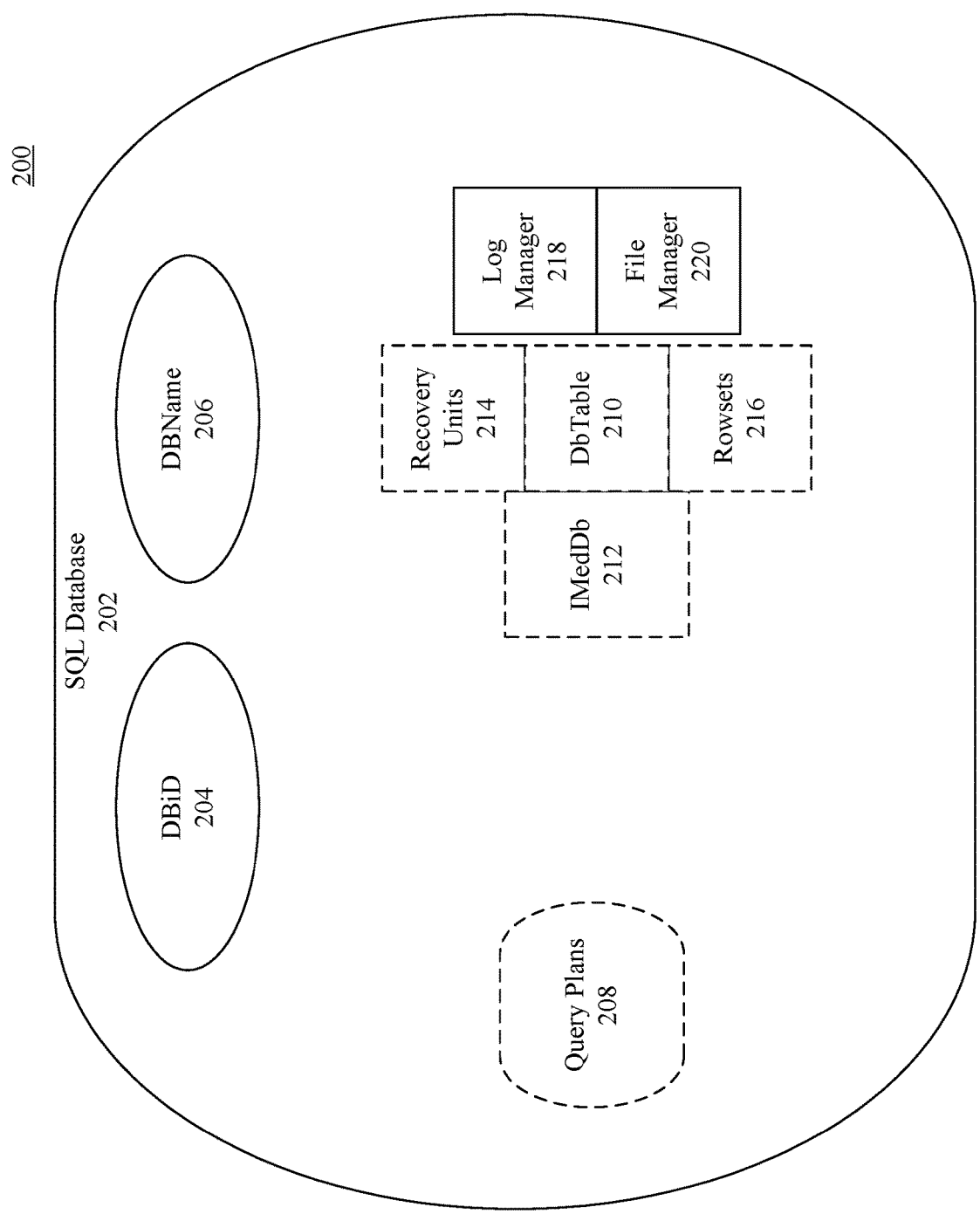
FIG. 2 depicts a logical block diagram of an example SQL database, according to an example embodiment.

FIG. 2 depicts a logical block diagram 200 of SQL objects that correspond to an example SQL database 202, according to an example embodiment. Block diagram 200 illustrates a conceptual view of the components that comprise and/or corresponds to a user database in a SQL server instance (e.g., control SQL node 104 or SQL compute nodes 116). SQL database 202 includes a DBiD 204, a DBName 206, a query plans 208, an IMEDDb 212, recovery units 214, a DbTable 210, a rowsets 216, a log manager 218 and a file manager 220. These components of SQL database 202 of FIG. 2 are described as follows.

As described above, certain database components or objects associated therewith assume that only a single version of metadata can exist. Thus, in a versioned system, the state and identity of such components and objects can only be defined with respect to a single version. The objects depicted with dashed lines within SQL database 202 are the objects associated with a database that are dependent on various items of metadata associated with the database, and thereby must be virtualized for embodiments to support versioned metadata. More specifically, query plans 208, IMedDb 212, recovery units 214, DbTable 210 and rowsets 216 are objects that are defined only in terms of a single version of metadata, which means differences in metadata require such objects to likewise be different. Accordingly, embodiments create, for each version of metadata, an in-memory virtual database comprising only such objects that correspond to a particular version of metadata. The components and objects of SQL database 202 of FIG. 2 will now be described in further detail.

DBiD 204 of FIG. 2 is a unique identifier given to each user database in a SQL server instance such as control SQL node 104 or SQL compute nodes 116. The DBiD 204 of a user database such as SQL database 202 is used as the primary key for operations on a database (i.e., the means of referencing a particular database when performing operations thereon). DBName 206 is likewise a unique identifier, but in human readable form (i.e., corresponds to the text identifier specified when the database created).

As an optimization, SQL server will cache any query plans that have been generated in the course of executing a query, and are depicted in FIG. 2 as query plans 208. Such cached query plans are dependent on table schema and other metadata. Thus although such query plans may not literally be stored with or be a part of a database, they are nevertheless dependent on and inextricably linked to the database targeted by a query, and query plans 208 is depicted in SQL database 202 of FIG. 2 to signify this dependence for reasons explained further herein below.

Each database in SQL also contains numerous items of metadata about the database and database objects. For example, each database is associated with a set of system base tables that store certain metadata associated with the database, and such metadata is included in DbTable 210 of FIG. 2.

All SQL components access metadata objects through metadata interfaces that correspond to such objects. All such metadata objects are cached in memory in IMedDb 212. Furthermore, all such objects each possess and are referenced by an identifier that is globally unique since, as described above, a baseline operating assumption of SQL server is that only one unique version of any item of metadata may exist at any time.

In an embodiment, a single database may be broken into multiple database partitions termed recovery units. Each recovery unit is associated with its own set of data files and transaction logging stream, and each can be recovered independently of the other recovery units in the database. A recovery unit is a collection of filegroups, files, and logs that are transactionally consistent because they share the same log. The tables and indexes in the database can be assigned or partitioned to different recovery units to divide up the workload among multiple log streams per database. Once the database is divided into these separate recovery units, the overall availability and performance of the database can be increased by the ability to restore and recover individual recovery units separately from the rest of the database. Only the database portion that resides on the recovery unit being restored is unavailable during recovery. The rest of the database remains usable.

Recovery unit 214 comprises the metadata that defines the partitions that comprise each of the above described recovery units. That is, recovery units 214 includes metadata concerning the files and file groups of all the tables, indexes and partitions of the database. The metadata also contains an association between the files and file groups and the corresponding recovery unit identifiers. As such recovery units 214 also depend on metadata.

Rowsets 216 comprise system table rowsets which, as known in the art, are defined only in terms of a particular schema and thus must also be re-mapped depending on which version of metadata should be visible at any given point in time. Thus, it can be appreciated that each of query plans 208, IMedDb 212, recovery units 214, DbTable 210 and rowsets 216 are dependent on database metadata, and that versioned metadata will necessarily require that the data and metadata underlying such components vary on a per-version basis.

Accordingly, embodiments provide virtual metadata versioning by maintaining a version history for each metadata version which reflects not only the changes to the metadata, but also a snapshot of the corresponding state of each of query plans 208, IMedDb 212, recovery units 214, DbTable 210 and rowsets 216 as of the point in time the new version came into being. The version history and corresponding snapshot may thereafter be used to construct a virtual database comprising only copies of the abovementioned components and the associated metadata, and thereafter transparently using the virtual database components whenever the database is referenced, scanned or otherwise queried as of the point in time that corresponds to that virtual database.

Figure 3:
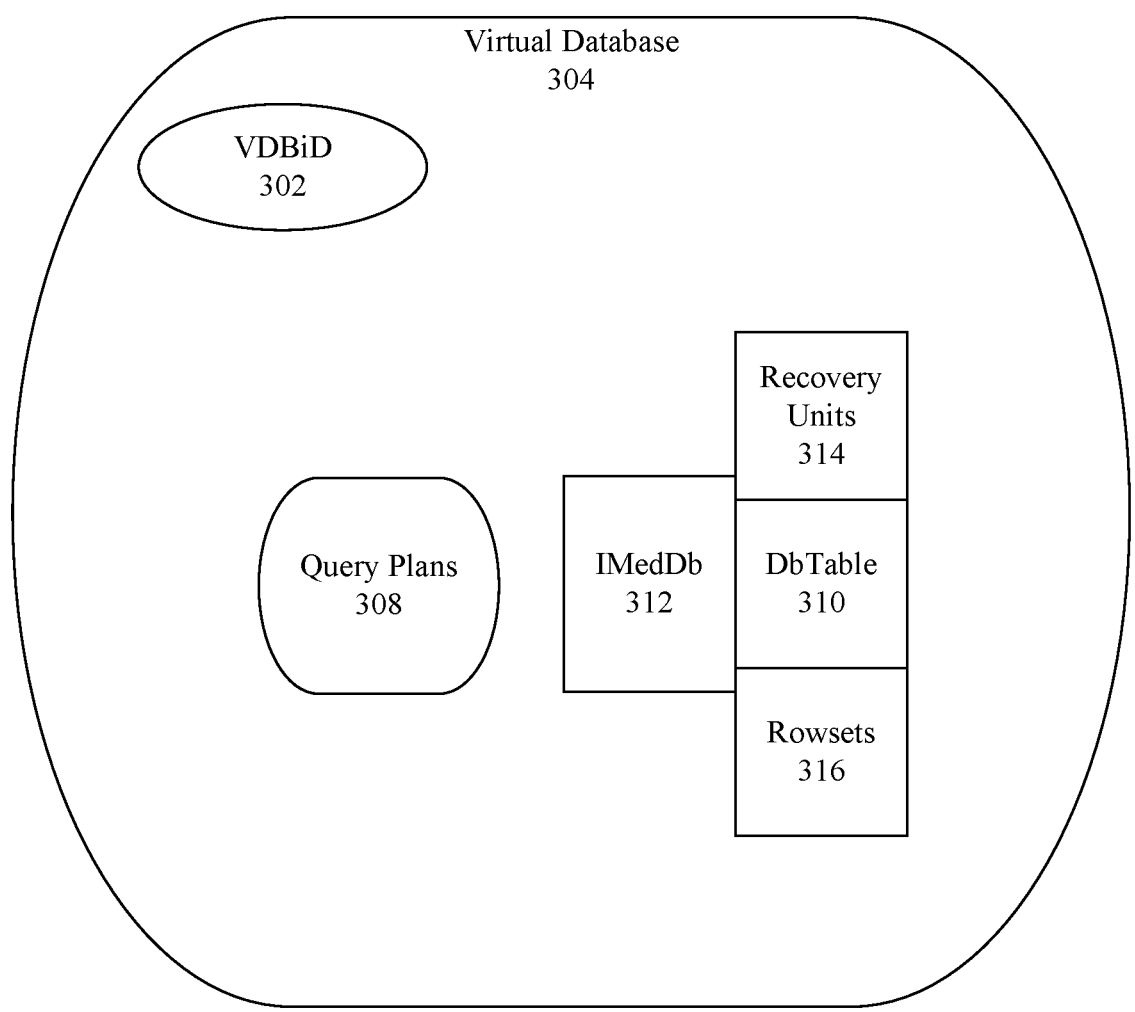
FIG. 3 depicts a logical block diagram of a virtual database ("VDB"), according to an example embodiment.

For example, consider FIG. 3 which depicts a logical block diagram 300 of a virtual database ("VDB") 304, according to an example embodiment. VDB 304 includes a VDBiD 302, query plans 308, IMedDb 312, recovery units 314, DbTable 310 and rowsets 316 each of which correspond to query plans 208, IMedDb 212, recovery units 214, DbTable 210 and rowsets 216 as of a particular point in time. Accordingly, each instance of VDB 304 corresponds to a single metadata version. Conceptually, therefore, an instance of a SQL database that is incapable of natively managing versioned metadata may nevertheless simulate versioned metadata by mapping an appropriate VDB 304 onto the database.

Figure 4:
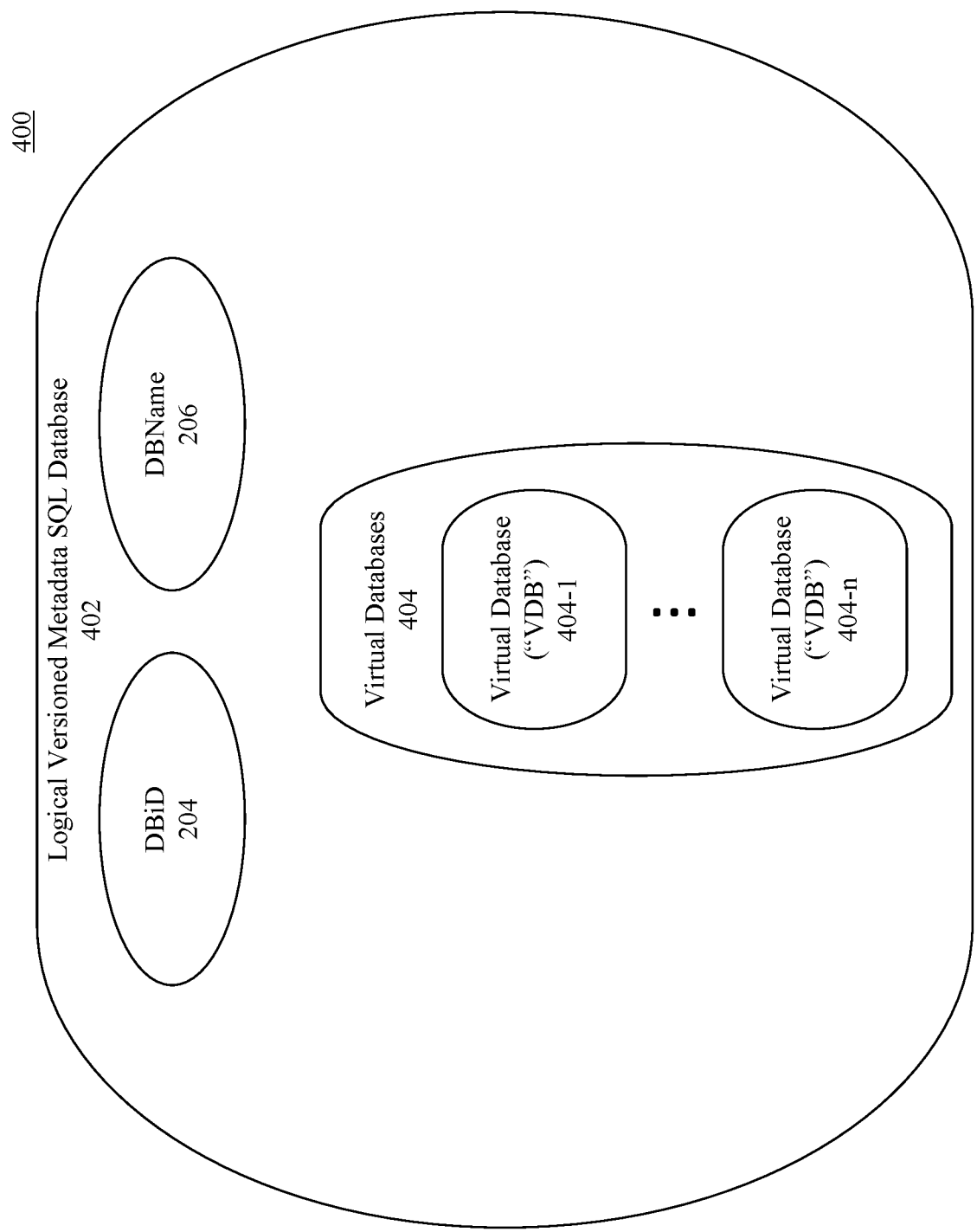
FIG. 4 depicts a block diagram of an example logical versioned metadata SQL database utilizing virtual databases ("VDBs") that correspond to different metadata versions, according to an example embodiment.

FIG. 4 depicts a block diagram 400 of an example logical versioned metadata SQL database 402 utilizing virtual databases ("VDBs") 404 that correspond to different metadata versions, according to an example embodiment. Logical versioned metadata SQL database 402 includes DBiD 204 and DBName 206 as depicted in FIG. 2. Logical versioned metadata SQL database 402 also includes virtual databases 404. Virtual databases 404 include VDB 404-1 to VDB 404-n.

Logical versioned metadata SQL database 402 constitutes a logical database inasmuch as the stored physical metadata of the underlying database cannot and does not, as described above, store versions of the metadata. Instead, the underlying database stores only the metadata that reflects the most recent change to such metadata. Older versions of the metadata are managed and stored by GLM server 108 as described briefly above. Logical versioned metadata SQL database 402 is a user database that may include a VDB such as VDB 404-1 mapped onto the underlying user database.

As such, and as will be described in further detail below, a query over the user database at a certain point in time will execute over the logical combination of the user database and the VDB that corresponds to the metadata version that existed at that certain point in time. That is, a query against the user database will be configured to automatically use query plans 308, IMedDb 312 recovery units 314, DbTable 310 and/or rowsets 316 of the mapped VDB whenever the executing query references any of query plans 208, IMedDb 212, recovery units 214, DbTable 210 or rowsets 216 of the user database. Since, as mentioned above, each VDB of virtual databases 404 corresponds to a particular version of metadata as of a particular point in time, embodiments are configured to determine which VDB of virtual databases 404 ought to be used for a particular operation. In particular, embodiments determine which VDB to use for performing an operation by evaluating transaction visibility as will now be described in conjunction with FIGS. 5a and 5b.

Figures 5A, 5B:
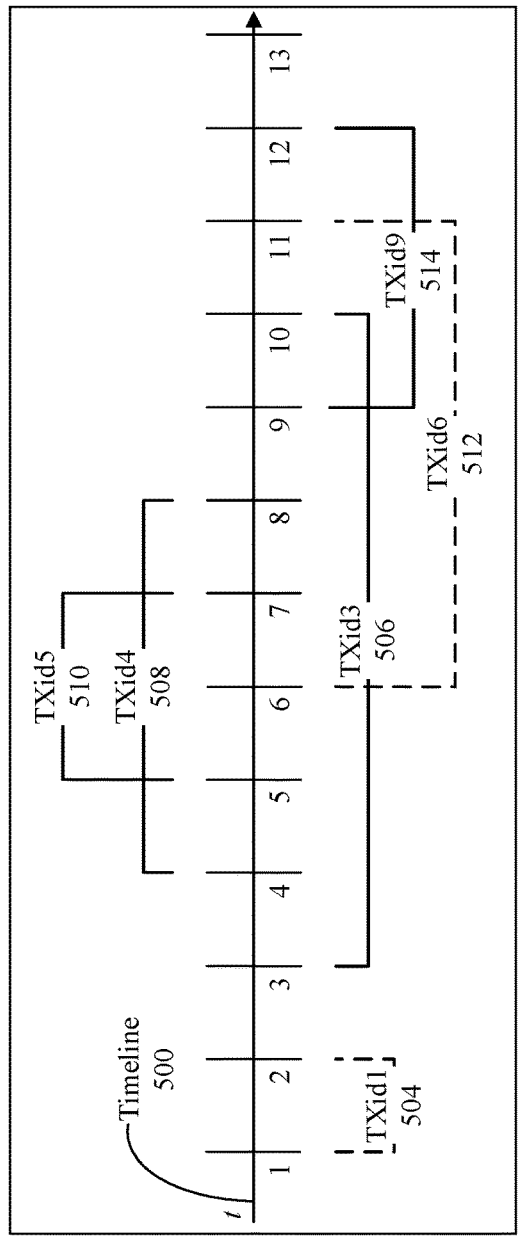
FIG. 5a depicts a timeline of example transactions, according to an example embodiment.
FIG. 5b depicts a table illustrating aspects of transaction visibility and VDB selection for the example transactions depicted in FIG. 5a, according to an example embodiment.

FIG. 5a depicts a timeline 500 of example concurrent metadata transactions, according to an example embodiment. The example transactions depicted in FIG. 5a include six transactions denoted as TXid1 504, TXid3 506, TXid4 508, TXid5 510, TXid6 512 and TXid9 514. Each transaction is associated with a transaction identifier ("TXid"), and the numeral included with each such TXid corresponds to the start time of the respective transaction. Each transaction illustrated in timeline 500 includes a line extending between the start time of that transaction and the commit time for that transaction. The commit time for a transaction is the point in time when all data and/or metadata modifications performed since the start of the transaction are committed to and become a permanent part of the database, and any resources allocated or otherwise used by processing the transaction are freed. For example, TXid6 512 starts at t=6 on timeline 500, and is thus denoted as TXid6. Further, the line corresponding to TXid6 512 extends from the start time at t=6 to the commit time at t=11.

Each of TXid1 504 and TXid6 512 are depicted with a dashed line and correspond to a DDL CREATE command (i.e., a T-SQL CREATE command that creates a table in a database), whereas the remaining transaction are depicted with a solid line and correspond to DDL ALTER commands that alter the structure of an existing table. Accordingly, each of transactions TXid3 506, TXid4 508, TXid5 510 and TXid9 514 modify the metadata associated with the target of the ALTER command.

With reference to distributed database system 100 as depicted in FIG. 1, and as described above, GLM server 108 is configured to maintain a version history that reflects all changes to metadata within the database (e.g., a SQL user database). Accordingly, each ALTER command corresponding to transactions TXid3 506, TXid4 508, TXid5 510 and TXid9 514 causes the generation of a new version of the ALTERed metadata. Embodiments may generate a VDB that corresponds to each version, and as will be described further herein below, depending on whether an operation is required to reference a metadata version older than the current version. To better appreciate these concepts, consider FIG. 5b.

FIG. 5b depicts a table 502 illustrating aspects of transaction visibility and VDB selection for the example transactions depicted in FIG. 5a, according to an example embodiment. Table 502 includes nine columns of data including column TXid 516, $T_s$ 518, T-SQL 520, $T_c$ 522, TXN visibility $T_s$ 524, Visible Tables $T_s$ 526, VDB Key $T_s$ 528, TXN visibility $T_c$ 530 and Visible Tables $T_c$ 532. Column TXid 516 of table 502 includes the transaction identifiers for each of transactions TXid1 504 through TXid 514 as depicted in timeline 500 of FIG. 5a. The other columns of table 502 reflect properties and attributes for these transactions as will now be described.

Column $T_s$ 518 and column $T_c$ 520 are the start time and commit time, respectively, of the transactions corresponding to column TXid 516. For example, and with reference to FIG. 5a, TXid3 in column TXid 516 corresponds to a start time of 3, and a transaction commit time of 10 (as also shown by TXid3 506 of FIG. 5a). Note that table 502 of FIG. 5b is sorted by TXid from oldest to newest (i.e., from the least recently started transaction to the most recently started transaction) and as a consequence, the TXids and start times of of column TXid 516 and column $T_s$ 518, respectively, are strictly increasing. The values of the commit time for each transaction as shown in column $T_c$ 522, on the other hand, do not bear any particular relationship to one another since the duration of a transaction is not fixed, and a transaction that starts after another transaction may nevertheless finish before the transaction that started earlier.

Column T-SQL 520 shows the T-SQL command being executed for a given transaction. For example, the entry in column T-SQL 520 that corresponds to TXid1 of column TXid 516 shows that TXid1 is executing a T-SQL CREATE command that creates tables A, B and C.

Column TXN visibility $T_s$ 524 of table 502 lists the transaction(s) that are visible to its corresponding transaction in column TXid 516 at the time that transaction starts (as shown, e.g., in FIG. 5a). Embodiments maintain a transaction visibility list for prior points in time in order to quickly determine what metadata was visible at each point in time, and to generate a corresponding VDB which is a snapshot of the visible metadata and related structures at that point in time. For example, GLM server 108 and/or GLM client 116 may each maintain a transaction visibility list. In an embodiment, GLM server 108 and/or GLM client 116 may generate a transaction visibility list locally, or may receive such a list from transaction manager 110.

A number of methods may be employed to determine a transaction visibility list. At the heart of such methods, however, is the fundamental principal that a given transaction will only be visible at some time t if that transaction both started and committed prior to (or at) time t. Bearing this principal in mind, consider the values of column TXN visibility $T_s$ 524, each having the following general format: <maximum visible transaction>-[(<indivisible transaction>)].

The maximum visible transaction at time t is the committed transaction that started most recently. For example, and with reference to FIG. 5a, at t=9 on timeline 500, both TXid5 510 and TXid4 508 committed prior to t=9. However, TXid5 510 started later than TXid4 508 and, accordingly, is the maximum visible transaction at time t=9.

However, not all transactions that start before, for example, t=9 will be visible at t=9. This is because, as noted above, a transaction is visible only if it starts and commits prior to t=9. As shown in timeline 300 of FIG. 5a and column $T_c$ 522, TXid3 does not commit until after t=9 (i.e., at t=10). In this example, TXid3 is an "indivisible transaction" because, as discussed above, every transaction is ACID compliant meaning that TXid3 is atomic and either commits entirely or not at all. Since none of the changes of TXid3 (if any) have been committed as of t=9, that transaction is not visible at t=9. This is reflected by the entry 5-(3) for TXid9 in column TXN visibility $T_s$ 524 for TXid9. The entry 5-(3) simply means that all the transactions up to and including transaction 5 (i.e., TXid5) are visible except for transaction 3 (i.e., TXid3). Thus, at t=9, TXid1, TXid4 and TXid5 are visible and the tables visible at t=9 comprise the union of the changes made by each transaction. Changes made by each transaction are described below.

Transaction TXid1 CREATEs tables A, B and C and commits at t=2. Thus, the tables that are visible at t=2 are $A_{v1}$, $B_{v1}$ and $C_{v1}$. This fact is noted in column Visible Tables $T_c$ 532 which lists the tables (and their respective versions) that are visible when each corresponding transaction commits. The subscript v # associated with each table reflects a version number for that table. Accordingly, since tables A, B and C are being created by TXid1 in the first instance, the resulting table version for each will be v1. An ALTER command, on the other hand, changes the metadata for the target of the ALTER command which results in a new version being produced. For example, the T-SQL command associated with TXid3 of column TXid 516 is a command to ALTER table A that results in a new version v2 with the resulting table denoted as $A_{v2}$.

Continuing with the example visibility determination for t=9, TXid5 is, as shown in column $T_c$ 522, the next transaction to commit at t=7. Because no transaction other than transaction TXid1 had both started and committed at t=5 when TXid5 started, only TXid1 is visible meaning that the starting point for TXid5 is just the end point for TXid1: $A_{v1}$, $B_{v1}$ and $C_{v1}$ as shown in column Visible Tables $T_c$ 532. As shown in column T-SQL 520, TXid5 is executing an ALTER on table C which means that when it commits, table C will have a new version. Thus, at t=7 when TXid5 commits, the visible tables are $A_{v1}$, $B_{v1}$ and $C_{v2}$.

As shown in column $T_c$ 522, at time t=8, TXid4 is the last transaction to commit. TXid4 also starts with the tables created by TXid1 and executes an ALTER on table B. Accordingly, and for the same reasons at TXid5 discussed above, TXid4 will execute resulting in tables $A_{v1}$, $B_{v2}$ and $C_{v1}$.

Finally, and as described above, the visible tables as denoted by a transaction visibility of 5-(3) is the union of the changes made by TXid1, TXid4 and TXid5. That is, $[A_{v1}, B_{v1}, C_{v1}] \cup [A_{v1}, B_{v2}, C_{v1}] \cup [A_{v1}, B_{v1}, C_{v2}]$ which is just $A_{v1}$, $B_{v2}$ and $C_{v2}$. as shown in column Visible Tables $T_c$ 532 of FIG. 5b.

Note that column TXN visibility $T_c$ 530 illustrates the same result. That is, the principles of transaction visibility are applicable at any point in time, including at the time a transaction commits. Column TXN visibility $T_c$ 530 shows the transaction visibility at each point in time after a transaction commits. The visibility list shown in column TXN visibility $T_c$ 530 corresponds to the tables shown in column Visible Tables $T_c$ 532 which show the visible tables for a scan transaction at the corresponding point in time. Suppose, for example, that a scan transaction (not shown in FIGS. 5a or 5b) commences concurrently with TXid9 at t=9. In such an instance, embodiments would determine a transaction visibility for the scan transaction that is the same as that as TXid9 as described above, 5-(3), and the scan would operate over the logical database that includes a VDB corresponding to a transaction visibility of 5-(3). In this example, embodiments would generate a VDB (if it did not already exist due to an earlier scan) that reflects the table versions visible at that time. In this example, the tables that are visible due to a transaction visibility of 5-(3) are, as described above, $A_{v1}$, $B_{v2}$ and $C_{v2}$, and the VDB key for this VDB is denoted in column VDB Key $T_s$ 528 as $VDB_{5-(3)}$. As described above, a VDB key is used to reference the associated VDB and its respective versions of metadata in lieu of the current versions of metadata as persisted to the underlying physical database. This process will now be further described with reference to FIG. 6.

Figure 6:
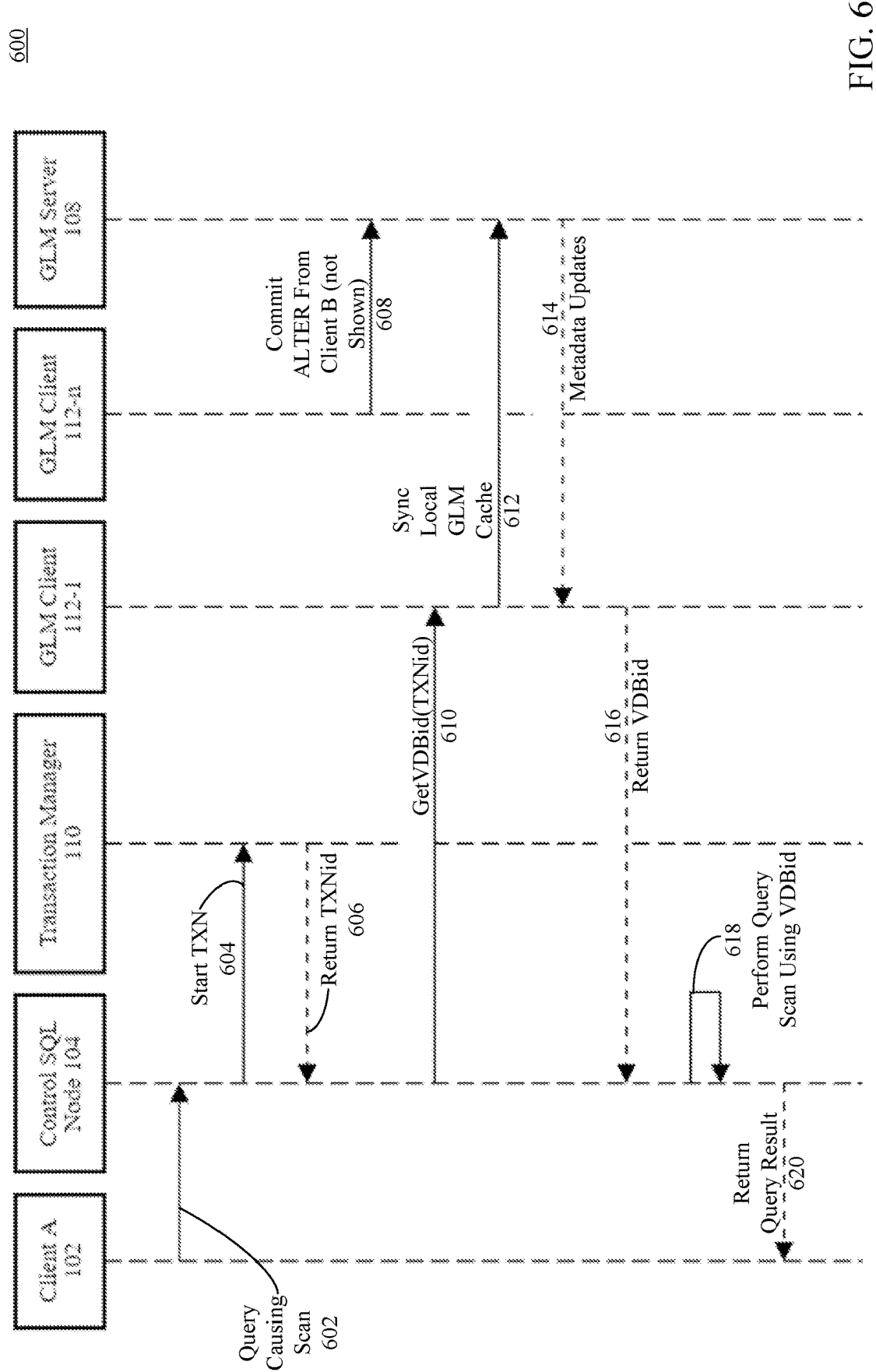
FIG. 6 depicts an example sequence diagram of a scan operation concurrently executing with a data description language ("DDL") command on the distributed database system of FIG. 1, according to an example embodiment.

FIG. 6 depicts an example sequence diagram 600 of a scan operation 602 concurrently executing with a data description language ("DDL") command 608 on the distributed database system 100 of FIG. 1, according to an example embodiment. Sequence diagram 600 depicts an example sequence of operations and associated dataflow illustrating how a VDB such as, for example, VDB 404-1 of FIG. 4 is created and used during a metadata scan 602 in the face of a concurrently committed DDL ALTER command 608.

Sequence diagram 600 is composed in a conventional manner whereby various entities are enumerated at the top of the diagram, and illustrates operations/data flow between such entities. The sequence diagram also illustrates the temporal relationship between the operations since the vertical axes are time axes with time increasing as you go down the axes. The entities of sequence diagram correspond to components of distributed database system 100. In particular, sequence diagram 600 includes Client 102 which is denoted as "Client A" to differentiate it from another concurrently operating client (i.e., "Client B") in sequence diagram 600. Sequence diagram 600 also includes control SQL node 104, transaction manager 110, GLM server 108 and two instances of GLM client 112. More specifically, GLM client 112-1 which corresponds to client A 102, and GLM client 112-n which corresponds to Client B (not shown).

Sequence diagram 600 will now be described in conjunction with FIGS. 7 and 8 which depict flowcharts 700 and 800, respectively, of example methods of providing versioned metadata using instances of non-versioned database applications, according to an embodiment. In an embodiment, flowcharts 700 and 800 may be performed by distributed database system 100 of FIG. 1. Although described with reference to system 100 as shown in FIG. 1, sequence diagram 600 of FIG. 6 and flowchart 700 and 800 are not limited to that implementation. Other structural and operational embodiments will be apparent to persons skilled in the relevant art(s) based on the following discussion regarding sequence diagram 600 of FIG. 6 and flowcharts 700 and 800 of FIGS. 7 and 8, respectively.

Figure 7:
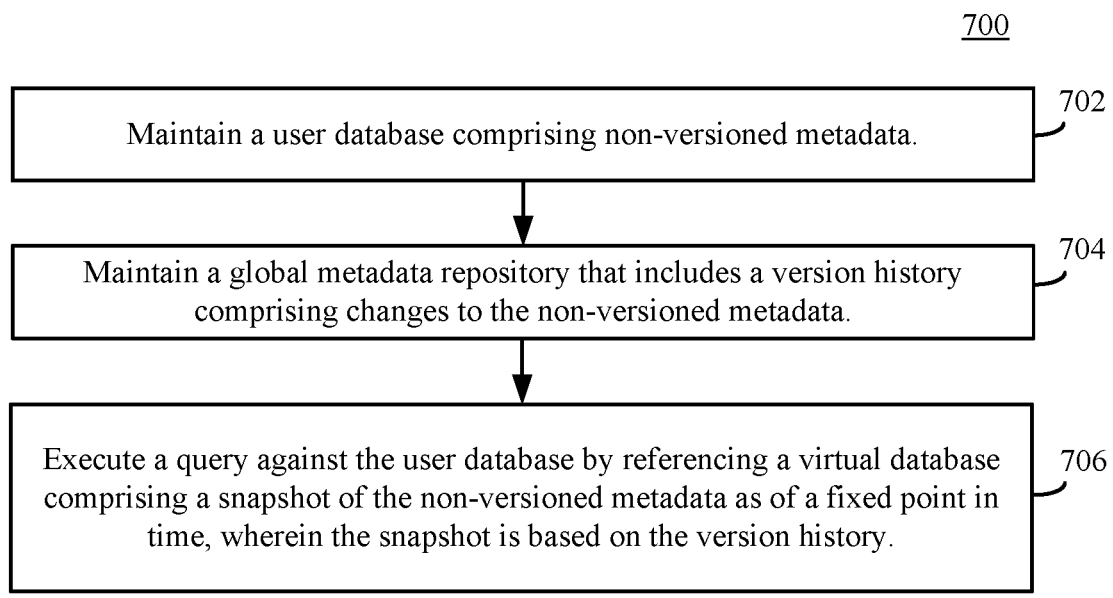
FIG. 7 depicts a flowchart of an example method of providing versioned metadata using instances of non-versioned database applications, according to an example embodiment.

Regarding FIG. 7, flowchart 700 begins with step 702. At step 702, a user database comprising non-versioned metadata is maintained. For example, and with continued reference to distributed database system 100 of FIG. 1, each of SQL compute nodes 116 store metadata in a non-versioned form because, as described above, versioned metadata is not an operating feature of SQL compute nodes 116. That is, SQL compute nodes 116 and databases created thereby operate under the assumption that all instances of metadata are unique and therefore, only a single version of metadata may ever exist. Flowchart 700 continues at step 704.

At step 704, a global metadata repository that includes a version history comprising changes to the non-versioned metadata is maintained. For example, and as described above with reference to distributed database system 100 of FIG. 1, GLM server 108 is configured to maintain a history of all modifications to metadata, and likewise maintain versions of such metadata corresponding to each such modification. Flowchart 700 concludes at step 706.

At step 706, a query is executed against the user database by referencing a virtual database comprising a snapshot of the non-versioned metadata as of a fixed point in time, wherein the snapshot is based on the version history. For example, and as described above with reference to distributed database system 100 of FIG. 1, GLM client 112 operates in conjunction with GLM server 108 to maintain a cache of the version history on each SQL compute node of SQL compute nodes 116. After a query begins to execute, a snapshot of the metadata required to complete the query is referenced rather than the user database wherein the snapshot includes the metadata versions that existed when the query began. For example, and with reference to distributed database system 100 of FIG. 1 and table 502 of FIG. 5, consider sequence diagram 600. Sequence diagram 600 begins at 602 with client A 102 sending a query to control SQL node 104 that will cause a metadata scan against the database. In response, control SQL node 104 operates in conjunction with transaction manager 110 to start a new transaction at 604 wherein transaction manager 110 returns a transaction identifier (TXNid) to control SQL node 104 at 606. The transaction identifier corresponds to the newly started transaction that performs the scan.

For example, suppose the scan transaction starts at t=9 on timeline 500 as described above. Further suppose that GLM client 112-n as shown in sequence diagram 600 of FIG. 6 commits an ALTER transaction at time t=10 on timeline 500 as shown at 608 of sequence diagram 600 (note, GLM client 112-n corresponds to a client B 102 different than client A 102 and that is not shown in sequence diagram 600 for the sake of brevity). At t=10, therefore, the ALTER transaction committed t=10 causes a new metadata version to be created as of t=10. However, the TXNid 606 returned to control SQL node 104 by transaction manager 110 is from an earlier transaction and, therefore, the new metadata version created by the ALTER at 608 should *not* be visible to the scan transaction.

The scenario illustrated in sequence diagram 600 and described immediately herein above corresponds to a scan started at t=9 on timeline 300, and TXid3 506 which is an ALTER transaction that does not commit until t=10. Accordingly, and as shown in column TXN visibility $T_s$ 524 of table 502, TXid3 should not be visible to any transaction that starts at t=9, and any such transaction must reference an earlier version of metadata.

Embodiments are configured to reference the correct earlier version of metadata by determining an identifier for a VDB that corresponds to that metadata as illustrated at 610 of sequence diagram 600. At 610, control SQL node 104 transmits the transaction identifier of the scan to GLM client 112-1 requesting the identifier for the VDB that references the correct version of metadata.

In the instance where GLM client 112-1 already has the correct VDB cached locally and the cache is in sync with the metadata store on GLM server 108, its identifier may be returned to control SQL node 104 immediately. If, however, the local cache of GLM client 112 does not already have the correct VDB, or the cache is not in sync with GLM server 108, then GLM client 112-1 may sync itself with GLM server 108 at step 612 as shown on sequence diagram 600.

Such a sync causes any pending metadata updates to propagate back to GLM client 112-1 at step 614, at which point GLM client 112-1 may return the VDBid of the VDB corresponding to the metadata of the visible transactions at step 616. Thereafter, the scan query will reference the VDB that corresponds to the returned VDBid when performing the scan. For example, and with continued reference to table 502 of FIG. 5*b*, a scan transaction initiated at t=9 would receive and subsequently reference $VDB_{5-(3)}$ which includes the correct versions of metadata as described in detail herein above in conjunction with FIGS. 5*a* and 5*b*.

In the foregoing discussion of steps 702-706 of flowchart 700, it should be understood that at times, such steps may be performed in a different order or even contemporaneously with other steps. For example, the maintaining steps 702 and 704 may be performed in any order or simultaneously. Other operational embodiments will be apparent to persons skilled in the relevant art(s). Note also that the foregoing general description of the operation of distributed database system 100 is provided for illustration only, and embodiments of distributed database system 100 may comprise different hardware and/or software, and may operate in manners different than described above. Indeed, steps of flowchart 700 may be performed in various ways.

Figure 8:
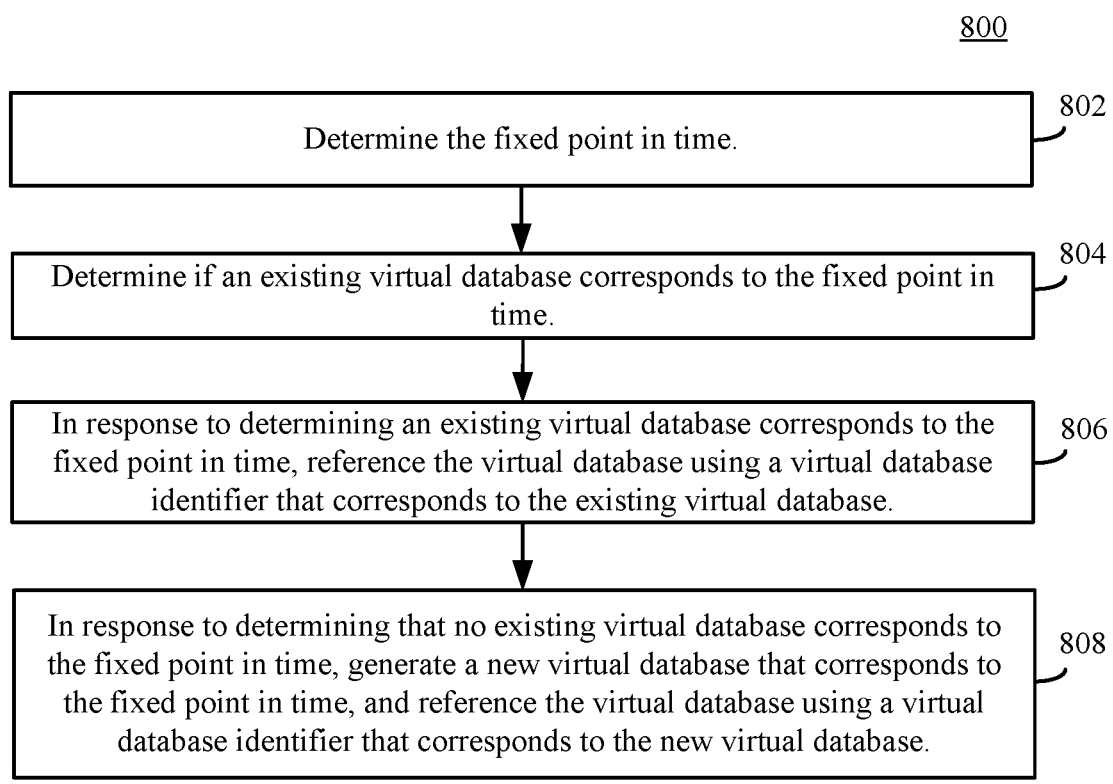
FIG. 8 depicts a flowchart of a refinement to the method depicted in FIG. 7, according to an embodiment.

For example, FIG. 8 depicts a flowchart 800 of an additional example method of generating event suggestions, according to an embodiment, and wherein flowchart 800 comprises refinements or additions to the method steps of flowchart 700 as depicted in FIG. 7. Accordingly, flowchart 800 of FIG. 8 will also be described with continued reference to distributed database system 100 of FIG. 1, timeline 500 and/or table 502 of FIGS. 5*a* and 5*b*, respectively, and sequence diagram 600 of FIG. 6. However, other structural and operational embodiments will be apparent to persons skilled in the relevant art(s) based on the following discussion regarding flowchart 800.

Regarding FIG. 8, flowchart 800 begins with step 802. At step 802, the fixed point in time is determined. For example, and as described in detail above, the fixed point in time corresponds to the start time of the transaction corresponding to the query. Determining the fixed point in time need not, however, directly require or use a transaction identifier. Instead, embodiments may also compare, for example, a commit timestamp that corresponds to the commit time of a transaction, or a log sequence number associated with a transaction log record may also be used to determine what point in time should be used to create the snapshot and logical VDB. Flowchart 800 continues at step 804.

At step 804, it is determined if an existing virtual database corresponds to the fixed point in time. For example, and as described above in conjunction with sequence diagram 600, when GLM client 112-1 receives the request for a VDBid from control SQL node 104, GLM client 112-1 is configured to determine if the correct VDB already exists in its local cache. That may occur when, for example, another transaction that required the same VDB already requested its identifier at some time prior. That is, GLM client 112 is configured to cache any VDB that it creates for some period of time in case another transaction needs it. Flowchart 800 continues at step 806.

At step 806, in response to determining an existing virtual database corresponds to the fixed point in time, the virtual database is referenced using a virtual database identifier that corresponds to the existing virtual database. For example, and as described above in conjunction with sequence diagram 600, where the correct VDB is already cached at GLM client 112-1, its identifier is returned to control SQL node 104 and subsequently referenced when needed during the scan. Flowchart 800 now concludes with at step 808.

At step 808, in response to determining that no existing virtual database corresponds to the fixed point in time, a new virtual database is generated that corresponds to the fixed point in time, and the virtual database is referenced using a virtual database identifier that corresponds to the new virtual database. For example, and as described above in conjunction with sequence diagram 600, where the correct VDB does not already exist in the local cache, GLM client 112-1 may generate the VDB locally provided that the correct metadata is already cached or, alternatively, may first sync the cache with GLM server 108 prior to creating the VDB. In either case, the VDBid corresponding to the newly created VDB is returned to control SQL node 104 and subsequently used in lieu of whatever the current metadata of the database may be at that time.

In the foregoing discussion of steps 802-808 of flowchart 800, it should be understood that at times, such steps may be performed in a different order or even contemporaneously with other steps. Note also that the foregoing general description of the operation of distributed database system 100 is provided for illustration only, and embodiments of distributed database system 100 may comprise different hardware and/or software, and may operate in manners different than described above.

III. Example Computer System Implementation

Each of distributed database system 100, client 102, control SQL node 104, global logical metadata server 108, transaction manager 110, global logical metadata client 112, SQL compute nodes 116, GLM caches 106-1 to 106*n*, GLM cache 107 and/or data caches 118-1 to 118-*n*, and flowchart 700 and/or 800 may be implemented in hardware, or hardware combined with software and/or firmware. For example, distributed database system 100, client 102, control SQL node 104, global logical metadata server 108, transaction manager 110, global logical metadata client 112, SQL compute nodes 116, GLM caches 106-1 to 106*n*, GLM cache 107 and/or data caches 118-1 to 118-*n*, and flowchart 700 and/or 800 may be implemented as computer program code/instructions configured to be executed in one or more processors and stored in a computer readable storage medium. Alternatively, distributed database system 100, client 102, control SQL node 104, global logical metadata server 108, transaction manager 110, global logical metadata client 112, SQL compute nodes 116, GLM caches 106-1 to 106n, GLM cache 107 and/or data caches 118-1 to 118-n, and flowchart 700 and/or 800 may be implemented as hardware logic/electrical circuitry.

For instance, in an embodiment, one or more, in any combination, of distributed database system 100, client 102, control SQL node 104, global logical metadata server 108, transaction manager 110, global logical metadata client 112, SQL compute nodes 116, GLM caches 106-1 to 106n, GLM cache 107 and/or data caches 118-1 to 118-n, and flowchart 700 and/or 800 may be implemented together in a SoC. The SoC may include an integrated circuit chip that includes one or more of a processor (e.g., a central processing unit (CPU), microcontroller, microprocessor, digital signal processor (DSP), one or more graphics processing units (GPUs), etc.), memory, one or more communication interfaces, and/or further circuits, and may optionally execute received program code and/or include embedded firmware to perform functions.

Figure 9:
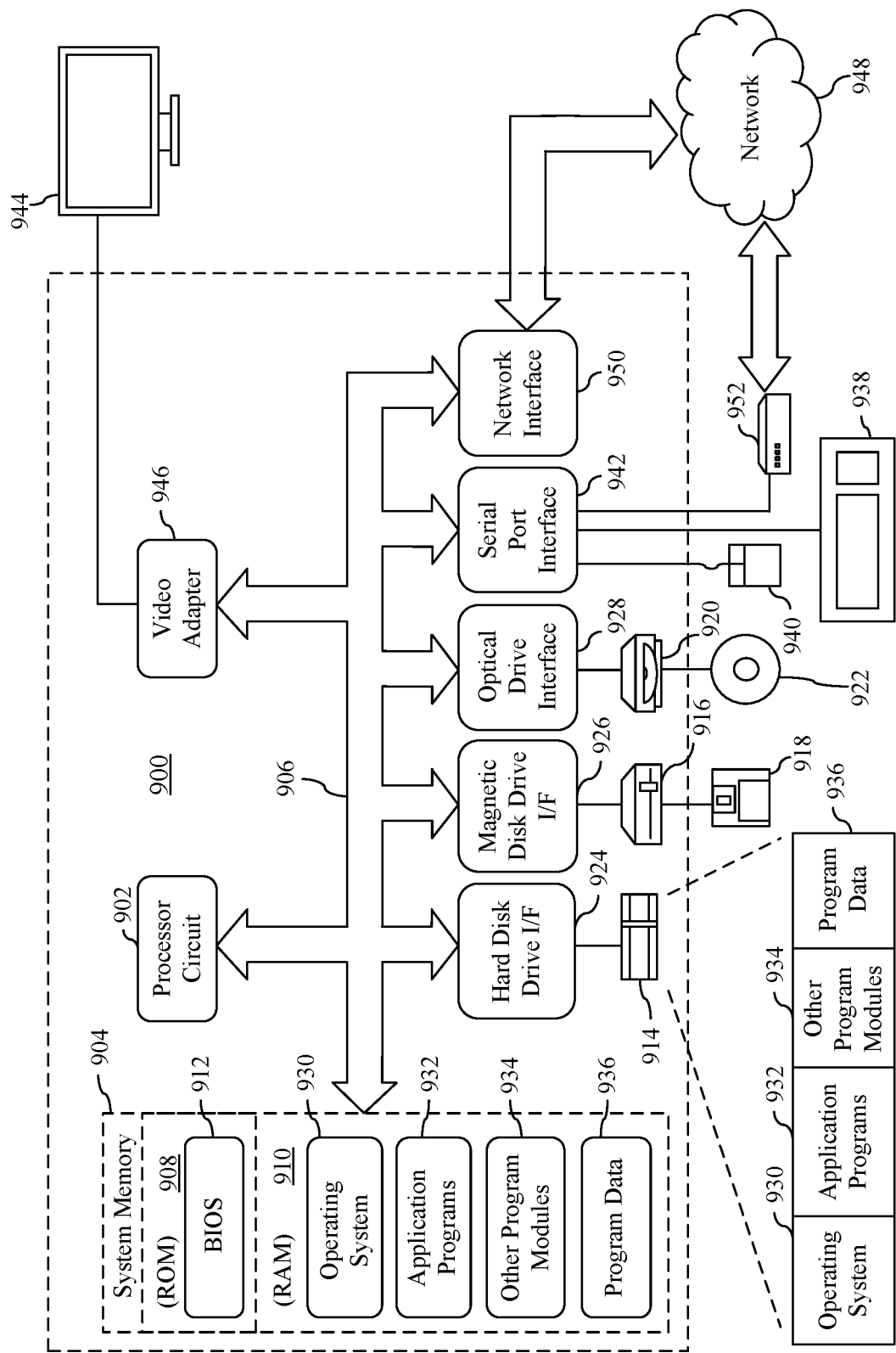
FIG. 9 is a block diagram of an example computer system in which embodiments may be implemented.

FIG. 9 depicts an exemplary implementation of a computing device 900 in which embodiments may be implemented. For example, distributed database system 100, client 102, control SQL node 104, global logical metadata server 108, transaction manager 110, global logical metadata client 112, SQL compute nodes 116, GLM caches 106-1 to 106n, GLM cache 107 and/or data caches 118-1 to 118-n may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing distributed database system 100, client 102, control SQL node 104, global logical metadata server 108, transaction manager 110, global logical metadata client 112, SQL compute nodes 116, GLM caches 106-1 to 106n, GLM cache 107 and/or data caches 118-1 to 118-n, and flowchart 700 and/or 800 (including any suitable step of flowchart 700 and/or 800), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments described herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

As described, systems and devices embodying the techniques herein may be configured and enabled in various ways to perform their respective functions for enabling schema and data modification concurrency in query processing pushdowns. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The additional examples and embodiments described in this Section may be applicable to examples disclosed in any other Section or subsection of this disclosure.

A distributed database system is provided herein. The distributed database system comprising: a user database including data and non-versioned metadata; a global metadata server configured to maintain a version history comprising changes to the non-versioned metadata; a control node configured to accept a query against the user database; and a first compute node including a query engine configured to receive the query from the control node and execute the query by referencing a virtual database comprising a snapshot of the non-versioned metadata as of a fixed point in time, wherein the snapshot is based on the version history.

In another embodiment of the distributed database system, the first compute node includes a global metadata client configured to maintain a cached copy of the version history and wherein the snapshot is based on the cached copy of the version history.

In another embodiment of the distributed database system, the query includes a command to alter the non-versioned metadata, and executing the query causes the metadata of the snapshot of the non-versioned metadata of the virtual database to be altered, and the global metadata client is further configured to propagate the altered metadata to the global metadata server.

In another embodiment of the distributed database system, the query engine is further configured to submit a request for and subsequently receive a virtual database identifier corresponding to the virtual database from the global metadata client, and to reference the virtual database using the virtual database identifier when executing the query.

In another embodiment of the distributed database system, the global metadata client is further configured to perform the following in response to receiving the request for the virtual database identifier: determine the fixed point in time; determine if an existing virtual database corresponds to the fixed point in time; in response to determining that an existing virtual database corresponds to the fixed point in time, provide to the query engine a virtual database identifier that corresponds to the existing virtual database; in response to determining that no existing virtual database corresponds to the fixed point in time, generate a new virtual database that corresponds to the fixed point in time, and provide to the query engine a virtual database identifier that corresponds to the new virtual database.

In another embodiment of the distributed database system, the global metadata client is configured to determine the fixed point in time based on at least one of: a transaction identifier of a transaction corresponding to the executing query; and a begin time of a transaction corresponding to the executing query.

In another embodiment of the distributed database system, the distributed database system further comprises a plurality of compute nodes including the first compute node, wherein each compute node of the plurality of compute nodes are configured to concurrently execute respective queries using snapshot isolation.

In another embodiment of the distributed database system, the distributed database system further comprises a transaction manager coupled to each compute node of the plurality of compute nodes and configured to maintain a transaction history for each transaction executed on each compute node, the transaction history comprising for each transaction: a transaction identifier; a begin time of the transaction; and one of a commit time or an abort time of the transaction.

A method in a first compute node of a distributed database system is provided herein. The method comprising: maintaining a user database comprising non-versioned metadata; maintaining a global metadata repository that includes a version history comprising changes to the non-versioned metadata; and executing a query against the user database by referencing a virtual database comprising a snapshot of the non-versioned metadata as of a fixed point in time, wherein the snapshot is based on the version history.

In another embodiment of the foregoing method, the method further comprises maintaining a cached copy of the version history, and wherein the snapshot is based on the cached copy of the version history.

In another embodiment of the foregoing method, executing the query comprises referencing the virtual database using a virtual database identifier that corresponds to the virtual database.

In another embodiment of the foregoing method, the method further comprises determining the fixed point in time; determining if an existing virtual database corresponds to the fixed point in time; in response to determining an existing virtual database corresponds to the fixed point in time, referencing the virtual database using the virtual database identifier corresponding to the existing virtual database; and in response to determining that no existing virtual database corresponds to the fixed point in time, generating a new virtual database that corresponds to the fixed point in time, and referencing the virtual database using the virtual database identifier corresponding to the new virtual database.

In another embodiment of the foregoing method, the fixed point in time is determined based on at least one of: a transaction identifier of a transaction corresponding to the executing query; and a begin time of a transaction corresponding to the executing query.

In another embodiment of the foregoing method, the query includes a command to alter the non-versioned metadata, the method further comprising: executing the query causing the metadata of the snapshot of the non-versioned metadata of the virtual database to be altered; and propagating the altered metadata to the global metadata repository.

A computer program product comprising a computer-readable memory device having computer program logic recorded thereon that when executed by at least one processor of a computing device causes the at least one processor to perform operations is provided herein. The operations comprising: maintaining a user database comprising non-versioned metadata; maintaining a global metadata repository that includes a version history comprising changes to the non-versioned metadata; and executing a query against the user database by referencing a virtual database comprising a snapshot of the non-versioned metadata as of a fixed point in time, wherein the snapshot is based on the version history.

In another embodiment of the foregoing computer program product, the operations further comprise maintaining a cached copy of the version history, and wherein the snapshot is based on the cached copy of the version history.

In another embodiment of the foregoing computer program product, executing the query comprises referencing the virtual database using a virtual database identifier that corresponds to the virtual database.

In another embodiment of the foregoing computer program product, the operations further comprise: determining the fixed point in time; determining if an existing virtual database corresponds to the fixed point in time; in response to determining an existing virtual database corresponds to the fixed point in time, referencing the virtual database using the virtual database identifier corresponding to the existing virtual database; and in response to determining that no existing virtual database corresponds to the fixed point in time, generating a new virtual database that corresponds to the fixed point in time, and referencing the virtual database using the virtual database identifier corresponding to the new virtual database.

In another embodiment of the foregoing computer program product, the fixed point in time is determined based on at least one of: a transaction identifier of a transaction corresponding to the executing query; and a begin time of a transaction corresponding to the executing query.

In another embodiment of the foregoing computer program product, the query includes a command to alter the non-versioned metadata, the method further comprising: executing the query causing the metadata of the snapshot of the non-versioned metadata of the virtual database to be altered; and propagating the altered metadata to the global metadata repository.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A distributed database system, comprising:
    a user database including data and a current version of first metadata;
    a global metadata server configured to maintain a version history comprising changes to the first metadata and maintain a second version of the first metadata older than the current version;
    a control node configured to accept a query against the user database; and
    a first compute node configured to:
        receive the query from the control node,
        in response to determining that an existing virtual database corresponds to a fixed point in time at query begin, execute the query by referencing the existing virtual database using a virtual database identifier corresponding to the existing virtual database, the existing virtual database referencing the second version of the first metadata, and
        in response to determining that no existing virtual database corresponds to the fixed point in time, generate a new virtual database that corresponds to the fixed point in time, and execute the query by referencing the new virtual database using a virtual database identifier corresponding to the new virtual database, the new virtual database referencing the second version of the first metadata.

2. The distributed database system of claim 1, wherein the first compute node includes a global metadata client configured to maintain a cached copy of the version history and wherein executing the query comprises referencing a snapshot that is based on the cached copy of the version history.

3. The distributed database system of claim 2, wherein the query includes a command to alter the first metadata, and executing the query causes the first metadata of the snapshot to be altered, and the global metadata client is further configured to propagate the altered first metadata to the global metadata server.

4. The distributed database system of claim 1, wherein the fixed point in time is determined based on at least one of:
    a transaction identifier of a transaction corresponding to the executing query; and
    a begin time of a transaction corresponding to the executing query.

5. The distributed database system of claim 1, further comprising a plurality of compute nodes including the first compute node, wherein each compute node of the plurality of compute nodes are configured to concurrently execute respective queries using snapshot isolation.

6. The distributed database system of claim 5, further comprising a transaction manager coupled to each compute node of the plurality of compute nodes and configured to maintain a transaction history for each transaction executed on each compute node, the transaction history comprising for each transaction:
   a transaction identifier;
   a begin time of the transaction; and
   one of a commit time or an abort time of the transaction.

7. The distributed database system of claim 1, wherein the first compute node is further configured to:
   synchronize with the global metadata server to cause pending metadata updates to propagate back from the global metadata server.

8. The distributed database system of claim 1, wherein the first compute node is further configured to:
   request, from a global metadata client executing on the first compute node, a virtual database identifier corresponding to the fixed point in time.

9. A method comprising:
   receiving a query against a user database comprising a current version of first metadata;
   in response to determining that an existing virtual database corresponds to a fixed point in time at query begin, executing the query by referencing the existing virtual database using a virtual database identifier corresponding to the existing virtual database, the existing virtual database referencing references a second version of the first metadata older than the current version, the second version of the first metadata maintained by a global metadata repository in a version history; and
   in response to determining that no existing virtual database corresponds to the fixed point in time, generating a new virtual database that corresponds to the fixed point in time, and execute the query by referencing the new virtual database using a virtual database identifier corresponding to the new virtual database, the new virtual database referencing the second version of the first metadata.

10. The method of claim 9, further comprising maintaining a cached copy of the version history, and wherein executing the query comprises referencing a snapshot that is based on the cached copy of the version history.

11. The method of claim 10, wherein the query includes a command to alter the first metadata and said executing the query causes the first metadata of the snapshot to be altered, the method further comprising:
   propagating the altered first metadata to the global metadata repository.

12. The method of claim 9, wherein the fixed point in time is determined based on at least one of:
   a transaction identifier of a transaction corresponding to the executing query; and
   a begin time of a transaction corresponding to the executing query.

13. The method of claim 9, further comprising:
   synchronizing with the global metadata repository to cause pending metadata updates to propagate back from the global metadata repository.

14. The method of claim 9, further comprising:
   requesting, from a global metadata client, a virtual database identifier corresponding to the fixed point in time.

15. A computer program product comprising a computer-readable storage medium having computer program logic recorded thereon that, when executed by a processor, causes the processor to:
   receive a query against a user database comprising a current version of first metadata;
   in response to determining that an existing virtual database corresponds to a fixed point in time at query begin, execute the query by referencing the existing virtual database using a virtual database identifier corresponding to the existing virtual database, the existing virtual database referencing a second version of the first metadata older than the current version, the second version of the first metadata maintained by a global metadata repository in a version history; and
   in response to determining that no existing virtual database corresponds to the fixed point in time, generate a new virtual database that corresponds to the fixed point in time, and execute the query by referencing the new virtual database using a virtual database identifier corresponding to the new virtual database, the new virtual database referencing the second version of the first metadata.

16. The computer program product of claim 15, wherein the computer program logic, when executed by the processor, further causes the processor to:
   maintain a cached copy of the version history, and wherein executing the query comprises referencing a snapshot that is based on the cached copy of the version history.

17. The computer program product of claim 16, wherein the query includes a command to alter the first metadata and executing the query causes the first metadata of the snapshot to be altered, the computer program logic, when executed by the processor, further causes the processor to:
   propagate the altered metadata to the global metadata repository.

18. The computer program product of claim 15, wherein the fixed point in time is determined based on at least one of:
   a transaction identifier of a transaction corresponding to the executing query; and
   a begin time of a transaction corresponding to the executing query.

19. The computer program product of claim 15, wherein the computer program logic, when executed by the processor, further causes the processor to:
   synchronize with the global metadata repository to cause pending metadata updates to propagate back from the global metadata repository.

20. The computer program product of claim 15, wherein the computer program logic, when executed by the processor, further causes the processor to:
   request, from a global metadata client a virtual database identifier corresponding to the fixed point in time.

* * * * *